(12) United States Patent
Matsumoto

(10) Patent No.: US 11,322,924 B2
(45) Date of Patent: May 3, 2022

(54) THUNDERBOLT ARREST-TYPE LIGHTNING PROTECTION DEVICE

(71) Applicant: LIGHTNING SUPPRESSION SYSTEMS CO., LTD., Yokohama (JP)

(72) Inventor: Toshio Matsumoto, Yokohama (JP)

(73) Assignee: LIGHTNING SUPPRESSION SYSTEMS CO., LTD., Yokohama (JP)

( * ) Notice: Subject to any disclaimer, the term of this patent is extended or adjusted under 35 U.S.C. 154(b) by 421 days.

(21) Appl. No.: 16/477,487

(22) PCT Filed: Jan. 11, 2018

(86) PCT No.: PCT/JP2018/000524
§ 371 (c)(1),
(2) Date: Jul. 11, 2019

(87) PCT Pub. No.: WO2018/131660
PCT Pub. Date: Jul. 19, 2018

(65) Prior Publication Data
US 2021/0135446 A1    May 6, 2021

(30) Foreign Application Priority Data

Jan. 11, 2017  (JP) .............................. JP2017-002934

(51) Int. Cl.
*H02G 3/00* (2006.01)
*H02G 13/00* (2006.01)

(52) U.S. Cl.
CPC ............. *H02G 13/40* (2013.01); *H02G 13/80* (2013.01)

(58) Field of Classification Search
CPC .............................. H02G 13/40; H02G 13/80
See application file for complete search history.

(56) References Cited

U.S. PATENT DOCUMENTS 4,652,694 A * 3/1987 Goldman ............... H02G 13/00
361/231
4,760,213 A * 7/1988 Gumley ................. H02G 13/80
361/138

(Continued)

FOREIGN PATENT DOCUMENTS

CN        2127227 Y    2/1993
JP        H113796 A    1/1999

(Continued)

OTHER PUBLICATIONS

English Translation of International Search Report from PCT/JP2018/000524 dated Apr. 24, 2018 (2 pages).

(Continued)

*Primary Examiner* — Pete T Lee
(74) *Attorney, Agent, or Firm* — Calfee Halter & Griswold LLP

(57) ABSTRACT

Provided is a thunderbolt arrest-type lightning protection device that has a protected area formed to match a structure and a shape of a protected body being protected from thunderbolts, and is capable of effectively protecting the entire protected body from thunderbolts.
The device is configured by: a charged body 2 formed of a conductive material provided to cover a protected body B installed on a ground G; an electrical insulation layer 3 that holds the charged body 2 in an electrically-insulated state with respect to the ground G and the protected body B; a capacitor 4 installed on the ground G, and stores an electrical charge by an electrostatic capacity with the ground; and a conductor 5 that electrically connects the charged body 2 and a second electrode body 4b.

10 Claims, 4 Drawing Sheets

(56) References Cited

U.S. PATENT DOCUMENTS

| | | | | |
|---|---|---|---|---|
| 6,069,314 A | * | 5/2000 | Varela | H02G 13/00 |
| | | | | 174/2 |
| 7,265,961 B2 | * | 9/2007 | D'Alessandro | H02G 13/80 |
| | | | | 361/111 |
| 2016/0285248 A1 | | 9/2016 | Maldonado | |

FOREIGN PATENT DOCUMENTS

| | | |
|---|---|---|
| JP | 3088727 U | 9/2002 |
| JP | 2002271964 A | 9/2002 |
| JP | 2014-175298 A | 9/2014 |
| JP | 5839331 B | 1/2016 |
| JP | 5876845 B2 | 3/2016 |
| WO | 2016-185753 A1 | 11/2016 |

OTHER PUBLICATIONS (1) Szczerbinski M Ed—Sedenik Norbert: "A discussion of 'Faraday cage' lightning protection and application to real building structures", Journal of Electrostatics, Elsevier Science Publishers B.V. Amsterdam, NL, vol. 48, No. 2,1 (Jan. 1, 2000), p. 145-154.

(1) Mamis Mehmet Salih et al: "Lightning surge analysis of Faraday cage using alternative transient program-electromagnetic transients program", IET Generation, Transmission & Distribution, IET, UK, vol. 10, No. 4, (Mar. 10, 2016), pp. 1016-1022.

* cited by examiner

THUNDERBOLT ARREST-TYPE LIGHTNING PROTECTION DEVICE

CROSS-REFERENCE TO RELATED APPLICATIONS

This application is the U.S. national phase entry of PCT Application No. PCT/JP2018/000524, filed Jan. 11, 2018, which claims priority to Japanese Patent Application Serial No. 2017-002934, filed on Jan. 11, 2017. The entire contents of the above-referenced applications are incorporated herein by reference.

TECHNICAL FIELD

The present invention relates to a thunderbolt arrest-type lightning protection device for protecting a protected body such as a building or equipment from lightning damage by arresting the thunderbolt.

BACKGROUND ART

Thunderbolt is a discharge phenomenon that occurs in the atmosphere, and lightning discharges include intra-cloud discharge, inter-cloud discharge, and cloud-earth discharge. It is the cloud-earth discharge (hereinafter referred to as lightning) that causes serious damage from lightning discharge. The thunderbolt is a phenomenon that occurs when an electric field strength between a thundercloud (cloud bottom) and the earth or a structure built on the earth and the like becomes extremely large, and its charge becomes saturated to destroy an insulation of the atmosphere.

Closely looking into the phenomenon of the thunderbolt, in the case of a general thunderbolt that occurs in summer (summer lightning), when the thundercloud matures, a stepped leader from the thundercloud comes close to the ground while choosing a location where it is likely to discharge in the atmosphere.

When the stepped leader reaches a certain distance from the ground, an upward streamer (a pickup discharge) of weak current extends from the ground, a building (lightning rod), a tree, or the like toward the stepped leader.

When the streamer and the stepped leader are combined, a large current (feedback current) flows between the thundercloud and the ground through the path.

This is a thunderbolt phenomenon.

With respect to such a lightning phenomenon, in the conventional lightning protection concept, a method of receiving the thunderbolt on a protruding rod-type lightning rod (Franklin rod) and flowing it to the ground is used in most cases, from the viewpoint that the thunderbolt cannot be prevented.

On the other hand, the present inventors proposed a thunderbolt arrest-type lightning protection device disclosed in Patent Document 1 in order to protect a protected body by arresting a thunderbolt from being generated as much as possible.

This thunderbolt arrest-type lightning protection device has an upper electrode body and a lower electrode body with an insulator interposed therebetween, and only the lower electrode body is grounded.

Then, for example, when a thundercloud in which negative charges are distributed at a cloud bottom approaches, the opposite charges (positive charge) are distributed on a surface of the ground, and the positive charges are also collected at the lower electrode body grounded.

Then, the upper electrode body disposed via the insulator is negatively charged by an action of a capacitor.

By this action, generation of an upward streamer in the lightning protection device and its periphery is less likely to occur, thereby suppressing generation of the thunderbolt.

CITATION LIST

Patent Document

Patent Document 1: JP 5839331 B1

SUMMARY OF THE INVENTION

Problem to be Solved by the Invention

The previous proposal by the inventors of the invention has made it possible to arrest the thunderbolt in a circular protection area centered on a lightning protection device.

However, a structure, a shape, and the like of a protected body to be protected from the thunderbolt are not constant, and there are also protected bodies that do not fall within the aforementioned protection area.

The present invention has been made to solve the problems remaining in the above-mentioned prior proposal, and intends to provide a thunderbolt arrest-type lightning protection device capable of forming a protection area in accordance with the structure and shape of the protected body to be protected from the thunderbolt and effectively protecting the entire protected body from the thunderbolt.

Means for Solving Problem

A thunderbolt arrest-type lightning protection device according to a first invention of the present invention is based on the aforementioned findings, and includes: a charged body formed of a conductive material provided to cover a protected body installed on a ground; an electrical insulation layer that holds the charged body in an electrically-insulated state with respect to the ground and the protected body; a capacitor installed on the ground and constituted by a first electrode body electrically connected to the ground and a second electrode body opposed to the first electrode body via the electrical insulation layer and storing electric charge by an electrostatic capacity between the first electrode body and the second electrode body; and a conductor that electrically connects the charged body and the second electrode body.

According to such a configuration, when a thundercloud having negative charges distributed at a cloud bottom approaches, the opposite charges (positive charges) are distributed on a surface of the ground, and the positive charges are also collected at the first electrode body of the capacitor that is grounded.

Then, the second electrode body opposed to the first electrode body via the electrical insulation layer bears the negative charges by action of the capacitor.

Further, the charged body electrically connected to the second electrode body by the conductor also bears the negative charges.

Here, the charged body is provided to cover the protected body and is electrically insulated from the protected body via the electrical insulation layer, whereby an entirety of the protected body is encompassed by the negative charges.

Therefore, an upward streamer from around the protected body hardly occurs, and the thunderbolt on the protected body is arrested.

And, the charged body can be installed according to the protected body, whereby the protected body is not influenced by a size, a shape or a structure of the protected body and the thunderbolt on the protected body can be effectively arrested.

A plurality of the capacitors can be provided, and according to such a configuration, it is possible to easily cope with, for example, a case where the size of the protected body is large and a large amount of negative charge is required to arrest the thunderbolt.

Further, the plurality of capacitors can be configured by a first capacitor having large electrostatic capacity and a second capacitor having small electrostatic capacity.

According to such a configuration, in a case where a lightning of energy higher than expected is generated and the lightning strikes the charged body, the lightning strike may flow to the ground through both the electrode bodies of the second capacitor having small electrostatic capacity.

Thus, it is possible to prevent the lightning strike from acting on the protected body and to prevent a damage to the protected body.

The plurality of capacitors are connected in series or in parallel to the charged body.

A thunderbolt arrest-type lightning protection device according to a second invention of the present invention is used for, for example, a protected body electrically insulated from a ground and installed at a height of 50 m to 100 m, for example, a transmitting antenna of a medium wave radio.

In order to conduct lightning protection of such a protected body, a capacitor, which is constituted by a first electrode body electrically connected to the ground and a second electrode body opposed to the first electrode body via the electrical insulation layer and storing electric charge by an electrostatic capacity between the first electrode body and the second electrode body, is installed on the ground, and the second electrode body of the capacitor is electrically connected to the aforementioned protected body by a conductor.

According to such a configuration, the electrostatic capacity of the capacitor is appropriately set for the protected body isolated from the ground, whereby it is possible to apply, to the protected body, an amount of negative charges corresponding to the size of the protected body and necessary for the lightning protection.

Effect of the Invention

According to a thunderbolt arrest-type lightning protection device of the present invention, even if a protection area to be required becomes large due to the shape, structure, and the like of the protected body, it is possible to sufficiently secure the protection area and effectively suppress generation of an upward streamer from the protected body, thereby enhancing a thunderbolt arrest effect.

MODE(S) FOR CARRYING OUT THE INVENTION

Hereinafter, a first embodiment of the first invention will be described with reference to FIGS. 1 to 3.

Figure 1:
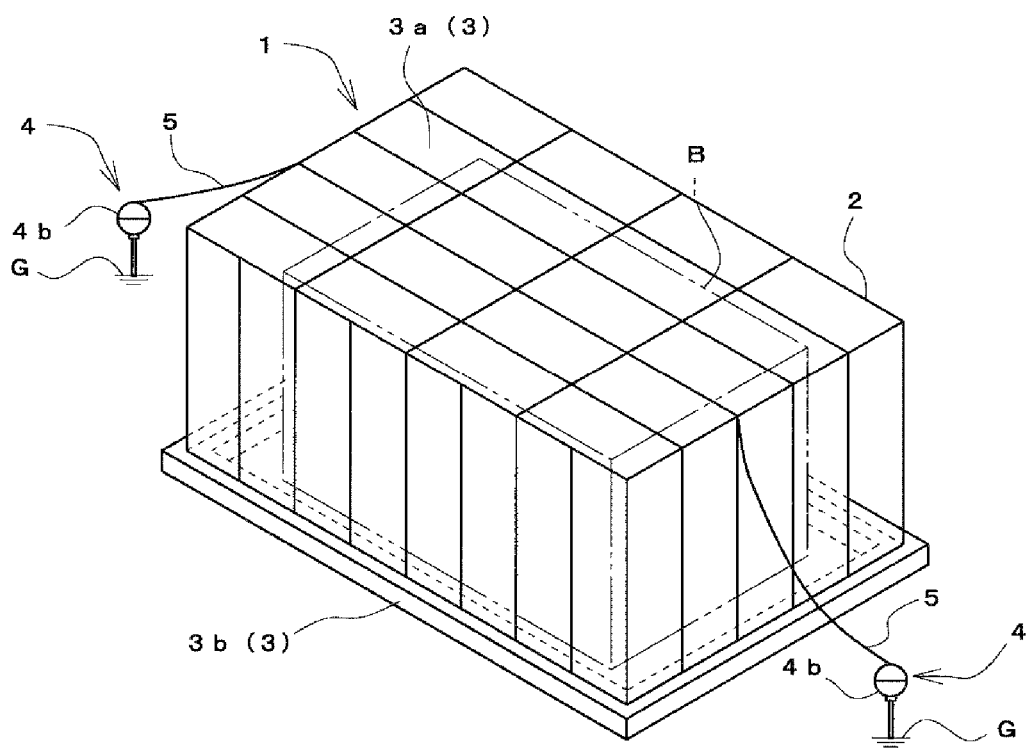
FIG. 1 is a perspective view schematically illustrating a first embodiment of a first invention.

In FIG. 1, reference numeral 1 denotes a thunderbolt arrest-type lightning protection device (hereinafter, abbreviated as a lightning protection device) according to the present embodiment.

Figure 2:
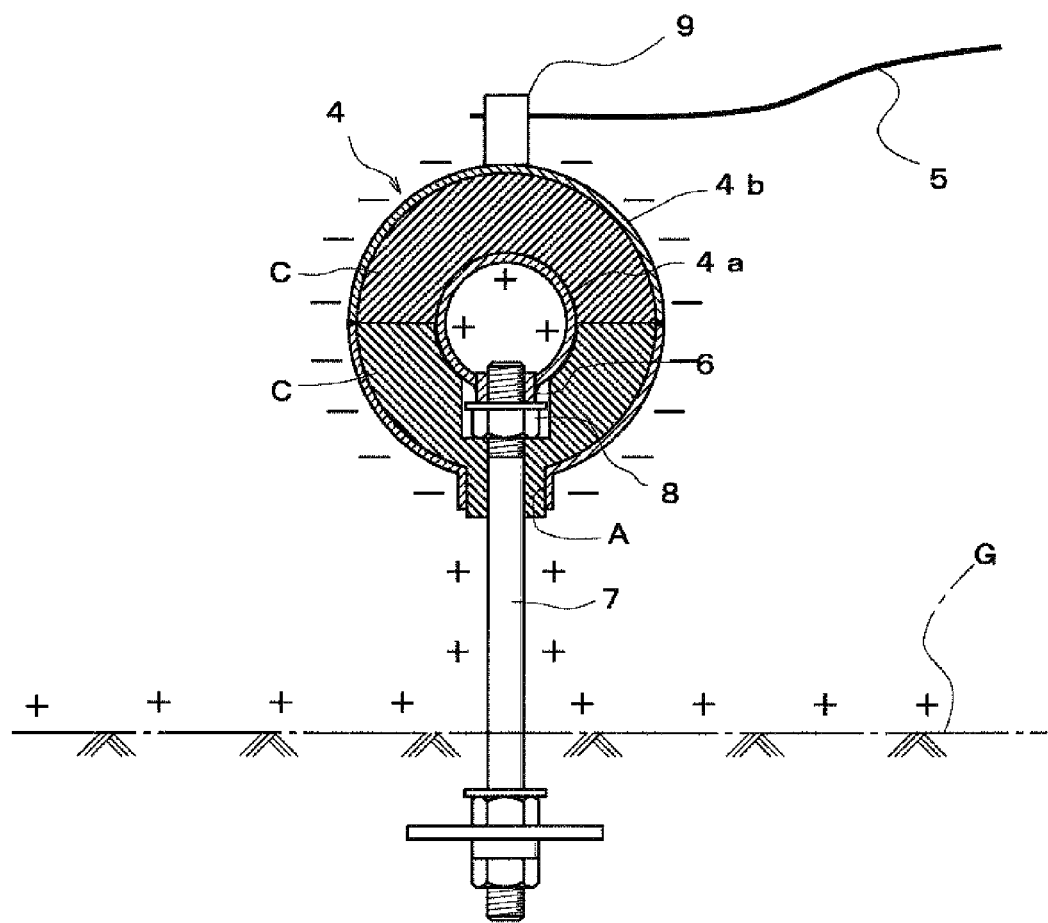
FIG. 2 illustrates the first embodiment of the first invention, and is a longitudinal sectional view illustrating an example of a capacitor.

The lightning protection device 1 of the present embodiment includes: a charged body 2 formed of a conductive material provided to cover a protected body B installed on a ground G; an electrical insulation layer 3 that holds the charged body 2 in an electrically-insulated state with respect to the ground G and the protected body B; a capacitor 4 installed on the ground G and constituted by a first electrode body 4a electrically connected to the ground G and a second electrode body 4b opposed to the first electrode body 4a via an electrical insulation layer C and storing electric charge by an electrostatic capacity between the first electrode body 4a and the second electrode body 4b, as described in detail in FIG. 2; and a conductor 5 that electrically connects the charged body 2 and the second electrode body 4b.

In the present embodiment, a building is illustrated as the protected body B, and the charged body 2 is provided so as to cover the entire top surface and side surface of the protected body B.

The charged body 2 is formed in a mesh shape in the present embodiment, and a mesh width is set according to a protection level, for example, the protection level is set to have four levels, and a maximum value of the mesh width is set to be 5 m, 10 m, 15 m and 20 m from the lowest protection level.

Further, a shape of the charged body 2 is set so as to have a predetermined interval over the entire surface thereof around the protected body B.

Further, the electrical insulation layer 3 is constituted by an air layer 3a formed between the charged body 2 and the protected body B and a support base 3b made of an electrical insulation material and laid on the ground G so as to wind the protected body B, and the charged body 2 is supported in an electrically-insulated state with respect to the ground G by the support base 3b.

In the present embodiment, as illustrated in FIG. 2, the capacitor 4 includes the second electrode body 4b formed in a hollow spherical shape and the first electrode body 4a formed in a spherical shape and disposed in the second electrode body 4b such that the first electrode body 4a has a predetermined interval between the entire surface thereof and an inner surface of the second electrode body 4b.

A nut 6 is integrally attached to a lower portion of the first electrode body 4a, and a tip of a support rod 7 to be described later is screwed into the nut 6.

A lock nut 8 is screwed to the support rod 7, and the lock nut 8 is pressed onto the nut 6, whereby the support rod 7 and the first electrode body 4a are fixed.

The second electrode body 4b is divided into upper and lower parts, and the parts are abutted and integrated so as to enclose the first electrode body 4a.

A through-hole A communicating an inside and an outside of the second electrode configuration body 4b is formed in the center of a lower portion of the second electrode configuration body 4b, and the support rod 7 electrically connected to the first electrode body 4a is inserted into the through-hole A, such that the first electrode body 4a is grounded via the support rod 7.

The electrical insulation layer C for electrically insulating the first electrode body 4a and the second electrode body 4b is formed of an electrically-insulating material and is provided so as to fill a gap between the first electrode body 4a and the second electrode body 4b and a gap between the second electrode body 4b and the support rod 7.

Further, a fixing member 9 for fixing one end portion of the conductor 5 in an electrically-conductive state is integrally provided on an upper portion of the second electrode body 4b.

In the present embodiment, the lightning protection device 1 is configured such that the support base 3b is laid so as to surround the protected body B, the charged body 2 is built on the support base 3b, the capacitor 4 is installed using the support rod 7 thereof at a position separated from the support base 3b on the ground G, and the second electrode body 4b of the capacitor 4 and the charged body 2 are electrically connected with each other by the conductor 5.

The thunderbolt arrest function by the lightning protection device 1 of the present embodiment configured in this manner will be described.

Figure 3:
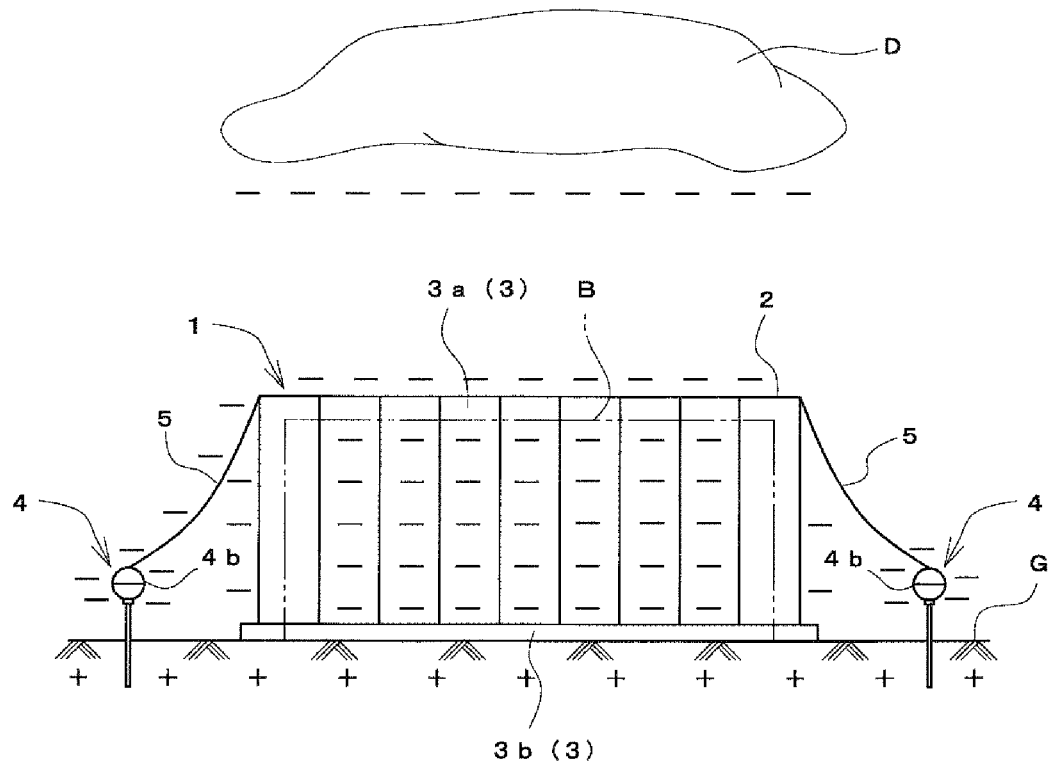
FIG. 3 is a schematic view for describing an action of suppressing generation of an upward streamer in the first invention.

As illustrated in FIG. 3, when the thundercloud D in which the negative charges are distributed at the cloud bottom approaches, the opposite charges (positive charges) are distributed on the surface of the ground G, and the positive charges are also collected on the first electrode body 4a grounded the ground G through the support rod 7, as illustrated in FIG. 2.

On the other hand, the second electrode body 4b opposed to the first electrode body 4a via the electrical insulation layer C bears the negative charges by the action of the capacitor, as illustrated in FIGS. 2 and 3.

Further, the charged body 2 electrically connected to the second electrode body 4b via the conductor 5 also bears the negative charges as a whole.

Therefore, a protection area B against the thunderbolt is formed over the entire surface of the protected body B by the charged body 2, and the negative charges on the protection area B make it difficult to generate upward streamers in the protected body B and its periphery, thereby suppressing the generation of the thunderbolt.

Here, the capacity of the capacitor 4, that is, the charge amount of the negative charges stored by the capacitor 4 may be limited and may not be sufficient to charge the charged body 2 with the negative charges necessary to cause the aforementioned lightning protection.

When such a situation is concerned, it can be dealt with by increasing the capacitor 4 connected to the charged body 2.

Figure 4:
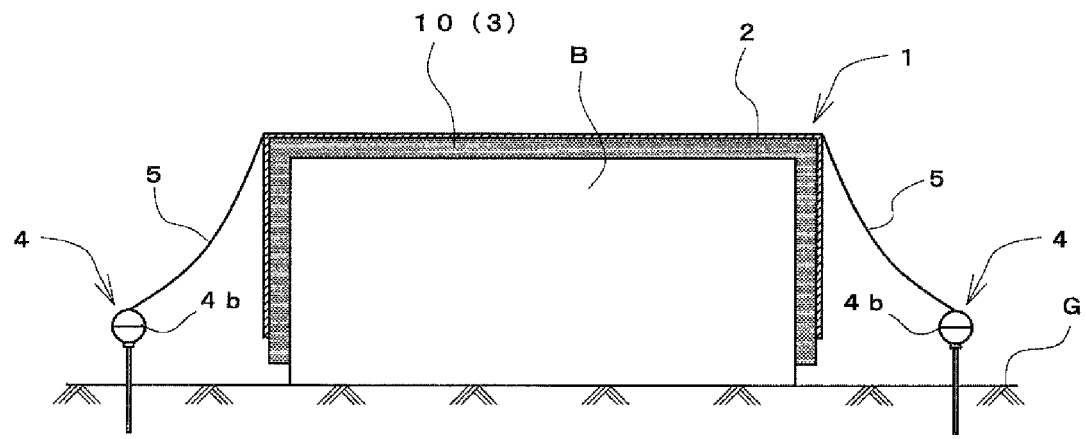
FIG. 4 is a schematic configuration view of a second embodiment of the first invention.

FIG. 4 illustrates a second embodiment of the first invention.

In the present embodiment, a support 10 formed of an electrically-insulating material is provided outside the protected body B, and the charged body 2 is built in the protected body B via the support 10.

Further, the support 10 regulates a distance between the protected body B and the charged body 2 and holds the charged body 2 in a state of being lifted from the ground G by a predetermined distance to electrically insulate the charged body 2 and the ground G.

Therefore, the support 10 constitutes the electrical insulation layer 3 which electrically insulates the charged body 2 from the protected body B and the ground G.

According to such a configuration, when configuring the protected body B, an installation process of the electrical insulation layer 3 may be combined in the configuring process.

Thereby, the lightning protection device 1 can be installed simply.

Further, when the charged body 2 is provided so as to float from the ground G, a vacant space of the ground G can be expanded.

Figure 5:
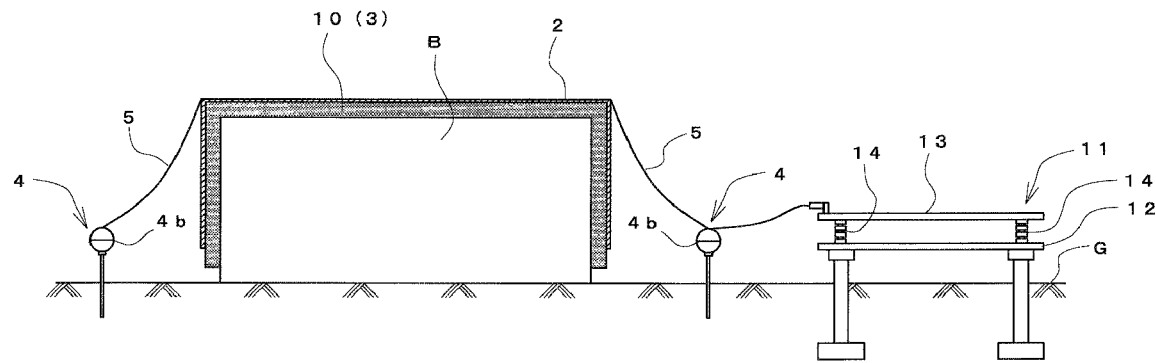
FIG. 5 is a schematic configuration view of a third embodiment of the first invention.

FIG. 5 illustrates a third embodiment of the first invention.

In the present embodiment, the capacitor 4 illustrated in each of the aforementioned embodiments is used as a first capacitor, and a capacitor 11 having an electrostatic capacity larger than that of the capacitor 4 is added as a second capacitor.

In the present embodiment, the capacitor 11 is configured by using two flat plate-like electrode bodies facing each other at a predetermined distance and having wide areas so that one of the flat plate-like electrode bodies is installed as the first electrode body 12 while being electrically conducted to the ground G and the other flat plate-like electrode body is connected to the first electrode body 12 via an electrically-insulating spacer 13 such as insulator to form a second electrode body 14.

Further, the capacitor 4 as the first capacitor and the capacitor 11 as the second capacitor may be connected to the charged body 2, as illustrated in FIG. 5, by a series connection in which the capacitor 11 as the second capacitor is connected to the charged body 2 via the capacitor 4 as the first capacitor or by a parallel connection in which the capacitor 4 as the first capacitor and the capacitor 11 as the second capacitor are respectively connected to the charged body 2.

According to such a configuration, the capacitance of the capacitor 11 as the second capacitor can be easily changed by changing the shapes of the first electrode body 12 and the second electrode body 14.

Thus, it is possible to generate negative charges of a capacity matched to a size of the charged body 2 and a protection level from the thunderbolt.

Further, if a lightning strike of energy higher than expected occurs and strikes the charged body 2, the capacitor 4 having a small capacity is short-circuited, whereby the energy of the lightning flows to the ground, thus protecting a damage to the protected body B.

Figure 6:
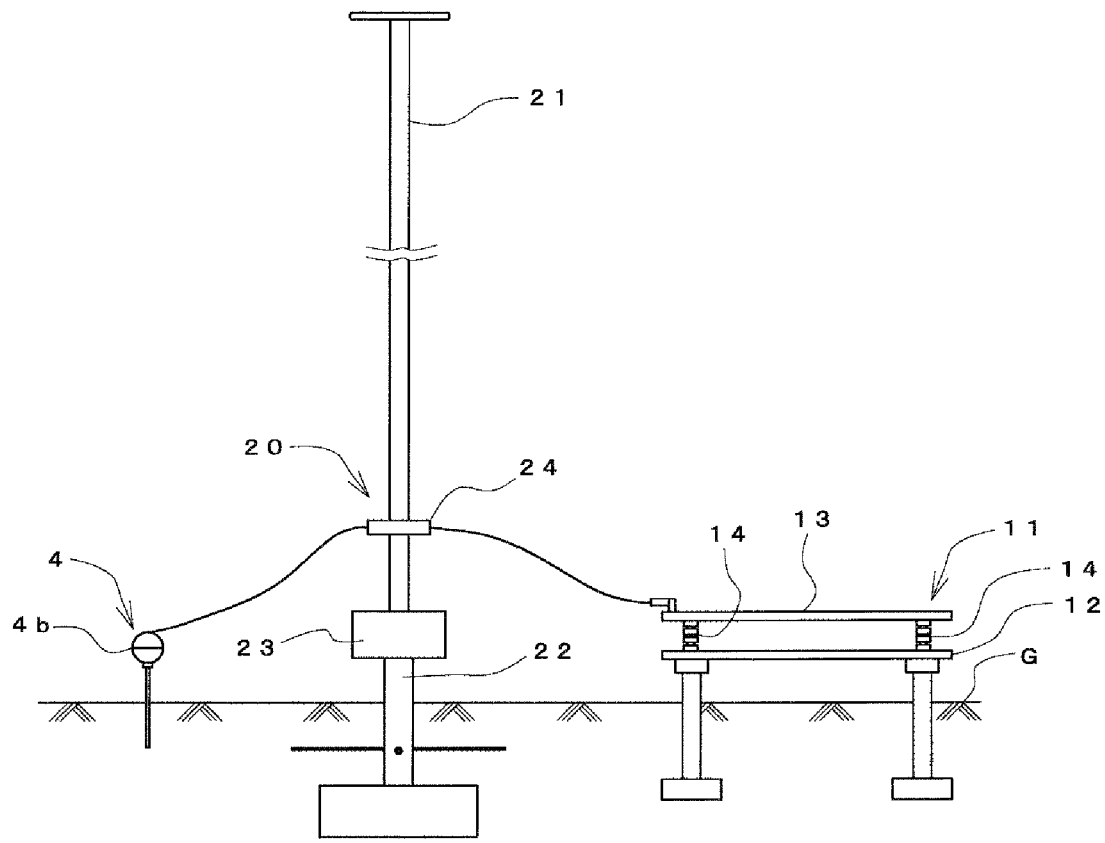
FIG. 6 is a schematic configuration view of a first embodiment of the second invention.

FIG. 6 illustrates an embodiment of the second invention.

Incidentally, in the following description, parts common to the constituent members illustrated in the first invention described above will be described using the same names and the same reference numerals to simplify the description.

In FIG. 6, reference numeral 20 denotes a lightning protection device according to the present embodiment, which is a thunderbolt arrest-type lightning protection device 20 for arresting the thunderbolt onto a protected body 21 installed in an electrically-insulated state with respect to the ground.

The protected body 21 is, for example, a transmitting antenna of a medium wave radio, and is a long pole supported by a support structure 22 built on the ground G via an electrical insulator 23.

Further, the protected body 21 is electrically insulated from the ground G by the electrical insulator 23, and a connector 24 is provided in the middle of the protected body 21 such that one end of the conductor 5 is fixed to the connector 24 while being in a state of electrical conduction.

Further, the other ends of the conductors 5 whose one ends are fixed to the connector 24 are electrically connected to the second electrode bodies 4b and 14 of two types of capacitors 4 and 11 separately installed on the ground G, respectively.

In the lightning protection device 20 of the present embodiment configured as described above, when the thundercloud D approaches and the ground G is positively charged, the negative charges are accumulated in the second electrode bodies 4b and 14 of the capacitors 4 and 11 and the protected body 21 electrically connected to the second electrode bodies 4b and 14.

Therefore, the protected body 21 is covered with the negative charges over the entire length thereof, whereby it is possible to arrest the thunderbolt onto the protected body 21 and obtain the same effect as that of the first invention described above.

Incidentally, the shapes, dimensions, and the like of the constituent members illustrated in each of the aforementioned embodiments are merely examples, and may be variously changed based on design requirements and the like.

For example, the configuration of the charged body 2 may be arbitrarily changed, and the configurations of the capacitors 4 and 11 may be appropriately changed.

In addition, a plurality of single use, a combination use, the number of use, and the like of the capacitors 4 and 11 having different capacities may also be appropriately selected.

EXPLANATIONS OF LETTERS OR NUMERALS 1 (THUNDERBOLT ARREST-TYPE) LIGHTNING PROTECTION DEVICE
2 CHARGED BODY
3 ELECTRICAL INSULATION LAYER
3a AIR LAYER
3b SUPPORT BASE
4 (FIRST) CAPACITOR
4a FIRST ELECTRODE BODY
4b SECOND ELECTRODE BODY
5 CONDUCTOR
6 NUT
7 SUPPORT ROD
8 LOCK NUT
9 FIXING MEMBER
10 SUPPORT
11 (SECOND) CAPACITOR
12 FIRST ELECTRODE BODY
13 SPACER
14 SECOND ELECTRODE BODY
20 LIGHTNING PROTECTION DEVICE
21 PROTECTED BODY
22 SUPPORT STRUCTURE
23 ELECTRICAL INSULATOR
24 CONNECTOR
A THROUGH-HOLE
B PROTECTED BODY
C ELECTRICAL INSULATION LAYER
D THUNDERCLOUD
G GROUND

What is claimed is:

1. A thunderbolt arrest-type lightning protection device comprising: a charged body formed of a conductive material provided to cover almost the entire area of a protected body installed on a ground; an electrical insulation layer that holds the charged body in an electrically-insulated state with respect to the ground and the protected body; a capacitor installed on the ground and including a first electrode body electrically connected to the ground and a second electrode body opposed to the first electrode body via a second electrical insulation layer and storing electric charge by an electrostatic capacity between the first electrode body and the second electrode body; and a conductor that electrically connects the charged body and the second electrode body.

2. The thunderbolt arrest-type lightning protection device according to claim 1, wherein a plurality of the capacitors are provided.

3. The thunderbolt arrest-type lightning protection device according to claim 2, wherein the plurality of capacitors include a first capacitor having small electrostatic capacity and a second capacitor having large electrostatic capacity.

4. The thunderbolt arrest-type lightning protection device according to claim 2, wherein the plurality of capacitors are connected in parallel to the charged body.

5. A thunderbolt arrest-type lightning protection device for arresting a thunderbolt onto a protected body installed in an electrical insulation state on a ground, the device comprising: an electrical insulation body that holds the protected body in an electrically-insulated state with the ground, a capacitor installed on the ground and including a first electrode body electrically connected to the ground and a second electrode body opposed to the first electrode body via a second electrical insulation layer and storing electric charge by an electrostatic capacity between the first electrode body and the second electrode body; and a conductor that electrically connects the protected body and the second electrode body.

6. The thunderbolt arrest-type lightning protection device according to claim 5, wherein a plurality of the capacitors are provided.

7. The thunderbolt arrest-type lightning protection device according to claim 6, wherein the plurality of capacitors include a first capacitor having small electrostatic capacity and a second capacitor having large electrostatic capacity.

8. The thunderbolt arrest-type lightning protection device according to claim 6, wherein the plurality of capacitors are connected in parallel to the protected body.

9. The thunderbolt arrest-type lightning protection device according to claim 3, wherein the plurality of capacitors are connected in parallel to the charged body.

10. The thunderbolt arrest-type lightning protection device according to claim 7, wherein the plurality of capacitors are connected in parallel to the protected body.

* * * * *